United States Patent
Miyama et al.

(10) Patent No.: US 6,806,113 B2
(45) Date of Patent: Oct. 19, 2004

(54) OPTICAL WAVEGUIDE DEVICE AND METHOD FOR FORMING OPTICAL WAVEGUIDE DEVICE

(75) Inventors: Yasuyuki Miyama, Chiba (JP); Hirotoshi Nagata, Chiba (JP); Toshihiro Sakamoto, Chiba (JP); Tetsuya Fujino, Chiba (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 242 days.

(21) Appl. No.: 09/959,156

(22) PCT Filed: Feb. 16, 2001

(86) PCT No.: PCT/JP01/01120
§ 371 (c)(1),
(2), (4) Date: May 6, 2002

(87) PCT Pub. No.: WO01/61401
PCT Pub. Date: Aug. 23, 2001

(65) Prior Publication Data
US 2002/0136478 A1 Sep. 26, 2002

(30) Foreign Application Priority Data
Feb. 18, 2000 (JP) .......... 2000-40575
Mar. 6, 2000 (JP) .......... 2000-60229

(51) Int. Cl.⁷ .......... G02B 6/27; H01L 21/64
(52) U.S. Cl. .......... 438/31; 385/11
(58) Field of Search .......... 385/2, 4, 5, 8, 385/11, 12; 359/487, 488; 29/25.35; 438/27, 29, 31, 706, 710

(56) References Cited
U.S. PATENT DOCUMENTS
5,749,132 A * 5/1998 Mahapatra et al. ........ 29/25.35

FOREIGN PATENT DOCUMENTS

| JP | 48-89711 | 11/1973 | |
| JP | 58-91425 | 5/1983 | |
| JP | 61-212822 | 6/1988 | |
| JP | 63-193132 | 9/1989 | |
| JP | 08220497 A | * 8/1996 | .......... G02F/1/035 |
| JP | 2000-180802 | 6/2000 | |
| JP | 2000-266951 | 9/2000 | |
| JP | 2000-275592 | 10/2000 | |

OTHER PUBLICATIONS

Miyamoto et al., "Evaluation of LiNbO Intensity Modulator Using Electrodes Buried in Buffer Layer," May 21, 1992, Electronics Letters, vol. 28, No. 11, p. 976–977.*

J.P.G. Bristow et al., Novel Integrated Optical Polarisers Using Surface Plasma Waves and Ion Milled Grooves in Lithium Niobate, *Electronics Letters*, vol. 20, No. 25/26 (1984), pp. 1047–1048.

(List continued on next page.)

*Primary Examiner*—Craig A. Thompson
*Assistant Examiner*—Jennifer M Dolan
(74) *Attorney, Agent, or Firm*—Young & Thompson

(57) ABSTRACT

An optical waveguide is formed on a substrate made of a material with an electro-optic effect. Then, an intermediate layer is fabricated, on the main surface of the substrate, by a dielectric material selected from the group consisting of $AO_x$, $B_2O_y$, $CO_z$ (A: divalent element, B: trivalent element, C: quadrivalent element, $0<x<1$, $0<y<3$, $0<z<2$, O: oxygen). Then, a metal-cladding type optical polarizer is fabricated on the intermediate layer and the optical waveguide. A buffer layer is formed and partially removed by non-reactive dry-etching to form a first opening. Subsequently, a metal-cladding type optical polarizer is fabricated inside the first opening, and a signal electrode and a ground electrode, constituting a modulation electrode, are fabricated on the buffer layer.

6 Claims, 3 Drawing Sheets

OTHER PUBLICATIONS

Y. Suematsu et al., Fundamental Transverse Electric Field ($TE_0$) Mode Selection for Thin–Film Asymmetric Light Guides, *Applied Physics Letters*, vol. 21, No. 6 (1972), pp. 291–293.

H. Nagata et al., Chemical Deterioration of Al Film Prepared on $DF_4$ Plasma–Etched $LiNbO_3$ Surface, *Journal of Materials Research*, vol. 15, No. 2 (Feb. 2000), pp. 476–482.

* cited by examiner

OPTICAL WAVEGUIDE DEVICE AND METHOD FOR FORMING OPTICAL WAVEGUIDE DEVICE

TECHNICAL FIELD

This invention relates an optical waveguide device and its fabrication method applicable for long haul and large capacity optical fiber communication system and an optical measuring instrument, particularly to an optical waveguide device having a metal-cladding type optical polarizer and its fabrication method for achieving a high extinction ratio and stabilizing the device performance against fluctuation of incident lightwave.

BACKGROUND ART

An optical waveguide device comprising an optical waveguide, a buffer layer and electrodes which are fabricated on a substrate having electro-optic effect, such as lithium niobate (LN), has been widely employed for long haul and large capacity optical fiber communication system and an optical measuring instrument.

The optical waveguide device is fabricated as follows: First of all, the optical waveguide is formed on the LN substrate by a Ti thermal diffusion method, and the buffer layer made of $SiO_2$, and the electrodes for modulation of lightwave propagating through the optical waveguide, are successively fabricated on the substrate. Then, the substrate is diced into chips and they are mounted on cases. Finally, optical fibers are connected to both ends of each chips to complete optical waveguide devices.

In general, the optical waveguide devices are operated using the lightwave with perpendicularly or horizontally polarized to a main surface of a substrate. From this point of view, a polarization maintaining fiber is usually connected to the input of the optical waveguide of the device, and the linearly polarized lightwave is introduced into the optical waveguide device.

However, if the polarization maintaining fiber is stressed from the outside or non-linearly polarized lightwave is introduced, extinction ratio of the optical waveguide device would be degraded. As the result, the optical waveguide device can not do on/off switching of lightwave correctly, so that the SIN ratio is degraded in the signal transmittance.

To solve the above-mentioned problem, a metal-cladding type optical polarizer proposed by Suematsu et al. in "Appl. Phys. Lett., Vol. 21, No. 6 (1972)" is applicable for the optional waveguide device. The metal-cladding type optical polarizer is utilizing difference in degree of electric field absorption depending on the state of polarization. Concretely, by the metal-cladding type optical polarizer, only polarized lightwave horizontal to a main surface of a substrate (TE mode lightwave) is transmitted, and a polarized lightwave perpendicular to the main surface (TM mode lightwave) is absorbed. The above optical waveguide device can exhibit a relatively high extinction ratio, regardless of its simple structure.

For the reduction of the excess absorption of the TE mode lightwave and the achievement of high extinction ratio, a dielectric film having a lower refractive index than that of the core of the optical waveguide may be fabricated as an intermediate layer between the optical waveguide and the metal-cladding type optical polarizer.

On the other hand, for the improvement of velocity matching, a buffer layer made of a dielectric material, such as $SiO_2$, is fabricated between the substrate and the electrodes to modulate the lightwave propagating through the optical waveguide, In this case, it is proposed that the buffer layer is partially etched by reactive ion etching using a fluorine-based gas such as $CF_4$ or $CHF_3$ to form an opening so as to expose the part of the substrate, and the metal-cladding type optical polarizer is provided in the opening. Therefore, the metal-cladding type optical polarizer can be integrated on the optical waveguide device having a thick buffer layer.

However, in this case, the buffer layer may be over-etched due to the fluctuation in its thickness and/or in the etching rate corresponding to different etching batches, so that the substrate may be partially etched. Therefore, if the metal-cladding type optical polarizer is provided on the etched substrate in the opening, the polarization property of the metal-cladding type optical polarizer may be fluctuated according to degree of over-etching against the substrate, resulting in the deterioration of the extinction ratio of the optical waveguide device.

On the other hand, the metal-cladding type optical polarizer may be fabricated on the intermediate layer composing by dielectric materials. In this case, during the long-term use of the optical waveguide device, mechanical peeling of the metal-cladding type optical polarizer due to heat cycle and/or thermal shock can be avoided.

However, when the metal-cladding type optical polarizer is fabricated on the intermediate layer composing by oxides, such as $SiO_2$, it is oxidized and corroded by long-term use. As a result, the performance of the optical waveguide device as having the metal-cladding type optical polarizer can not be stabilized for a long time.

DESCRIPTION OF THE INVENTION

It is an object of the present invention to provide an optical waveguide device with a metal-cladding type optical polarizer and its fabrication method to be able to realize a high extinction ratio for a long time through the performance of the metal-cladding type optical polarizer, irrespective of its configuration being formed on an intermediate layer or in an opening at the buffer layer, with keeping its formation advantages.

For achieving the above object, this invention relates to an optical waveguide device comprising:

a substrate made of a material with an electro-optic effect,
an optical waveguide formed on the substrate to transmit a lightwave,
a modulation electrode to modulate the lightwave,
a metal-cladding type optical polarizer to remove the unnecessary polarized component of the lightwave, and
an intermediate layer, between the substrate and the metal-cladding type optical polarizer, made of at least one dielectric material selected from the group consisting of AOx, $B_2Oy$, COz (A: divalent element, B: trivalent element, C: quadrivalent element, $0<x<1$, $0<y<3$, $0<z<2$, O: oxygen).

The inventors have intensely studied to stabilize the performance of an optical waveguide device having a metal-cladding type optical polarizer, and then, investigated the structure of the optical waveguide device in detail.

As a result, they found that the metal-cladding type optical polarizer was not peeled if it was fabricated on an intermediate layer with low internal stress, as mentioned above.

Since the metal-cladding type optical polarizer is required to be formed on the optical waveguide, the intermediate layer must be formed on the same optical waveguide. Therefore, if the intermediate layer is made of a material with higher refractive index than that of the substrate or the optical waveguide, a lightwave propagating through the optical waveguide is leaked toward the intermediate layer. Thus, the intermediate layer is required to be made of a material with relatively lower refractive index such as dielectric oxides.

As mentioned above, however, if the metal-cladding type optical polarizer is provided on the intermediate layer composing by dielectric oxides, it is oxidized and corroded. Therefore, the inventors have precisely studied to clarify the mechanism of the oxidization and corrosion. As a result, they have found that the excess oxygen in the intermediate layer was extricated with time, and diffused into the metal-cladding type optical polarizer formed on the intermediate layer, thereby to oxidize and corrode the polarizer.

Based on the above-mentioned study, the inventors have made a investigation to inhibit the extrication of the excess oxygen. As a result, they have found that oxidization and corrosion of the metal-cladding type optical polarizer could be inhibited when the intermediate layer was made of a dielectric oxides having a lower oxygen concentration than that of its stoichiometric concentration, because the excess oxygen was not generated in the intermediate layer.

This invention is achieved by the extensive and detailed researches as mentioned above.

The optical waveguide device of the present invention is created directly from the above researches, and has the intermediate layer of dielectric oxide between the substrate and the metal-cladding type optical polarizer.

According to the present invention, mechanical peeling, oxidization and corrosion of the metal-cladding type optical polarizer can be avoided, and thus, the performance of the optical waveguide device can be stabilized for a long time.

Furthermore, this invention relates to a fabrication method of an optical waveguide device consisting of an optical waveguide, a buffer layer, a metal-cladding type optical polarizer and a modulation electrode on a substrate with an electro-optic effect, comprising:

a first step to form the optical waveguide on the substrate, a second step to fabricate the buffer layer on the substrate, a third step, by means of partial removal of the buffer layer employing non-reactive dry-etching, to form a first opening so that the corresponding part of the main surface of the substrate on which the optical waveguide is formed, is partially or entirely exposed, and a fourth step to fabricate the metal-cladding type optical polarizer on the substrate inside the first opening.

Also, the inventors investigated, for a LN substrate, the cause of fluctuation in optical performance of the metal-cladding type optical polarizer, when it was fabricated in a buffer layer opening of which the substrate was slightly etched in the formation process.

As the result, they found that the metal-cladding type optional polarizer was corroded when it was fabricated in such opening, although it was not corroded when it was fabricated directly on the substrate without forming buffer layer. As they made further investigation on the corrosion phenomenon, they found that the excess oxygen from the main surface of the substrate was the cause of its corrosion.

Then, since the excess oxygen is generated when the substrate is attacked by fluorine-based gas plasma because of over-etching of the buffer layer, the inventors conceive the following mechanism of generating the excess oxygen. That is, when the chemically reactive etching using fluorine-based gas plasma is employed, the fluorine radicals as main etching species are selectively reacted with the lithium constituting the LN substrate, to form fluorides. Because, the lithium is selectively extricated from the LN substrate as lithium fluoride, the excess oxygen is generated.

On the above excess oxygen generating mechanism, the inventors employ non-reactive physical etching using argon gas plasma, and the buffer layer is partially etched to form an opening, in which the metal-cladding type optical polarizer is fabricated In this case, the metal-cladding type optical polarizer is never corroded, and thus, the optical performance of the polarizer is not changed.

This invention is also achieved through the vast research and development.

According to the present invention, even though the substrate is attacked by fluorine-based gas plasma because of over-etching of the buffer layer occurred in the fabrication process of buffer layer opening, the excess oxygen is not generated on the main surface, particularly in the superficial layer of the substrate. Therefore, when the metal-cladding type optical polarizer is fabricated in the opening, it is not oxidized and corroded.

Accordingly, the polarization property of the metal-cladding type optical polarizer can be stabilized and thus, the optical waveguide device having a high extinction ratio can be provided.

BRIEF DESCRIPTION OF DRAWINGS

The invention will be more particularly, described with reference to the accompanying drawings, in which.

BEST MODE FOR CARRYING OUT THE INVENTION

Figure 1:
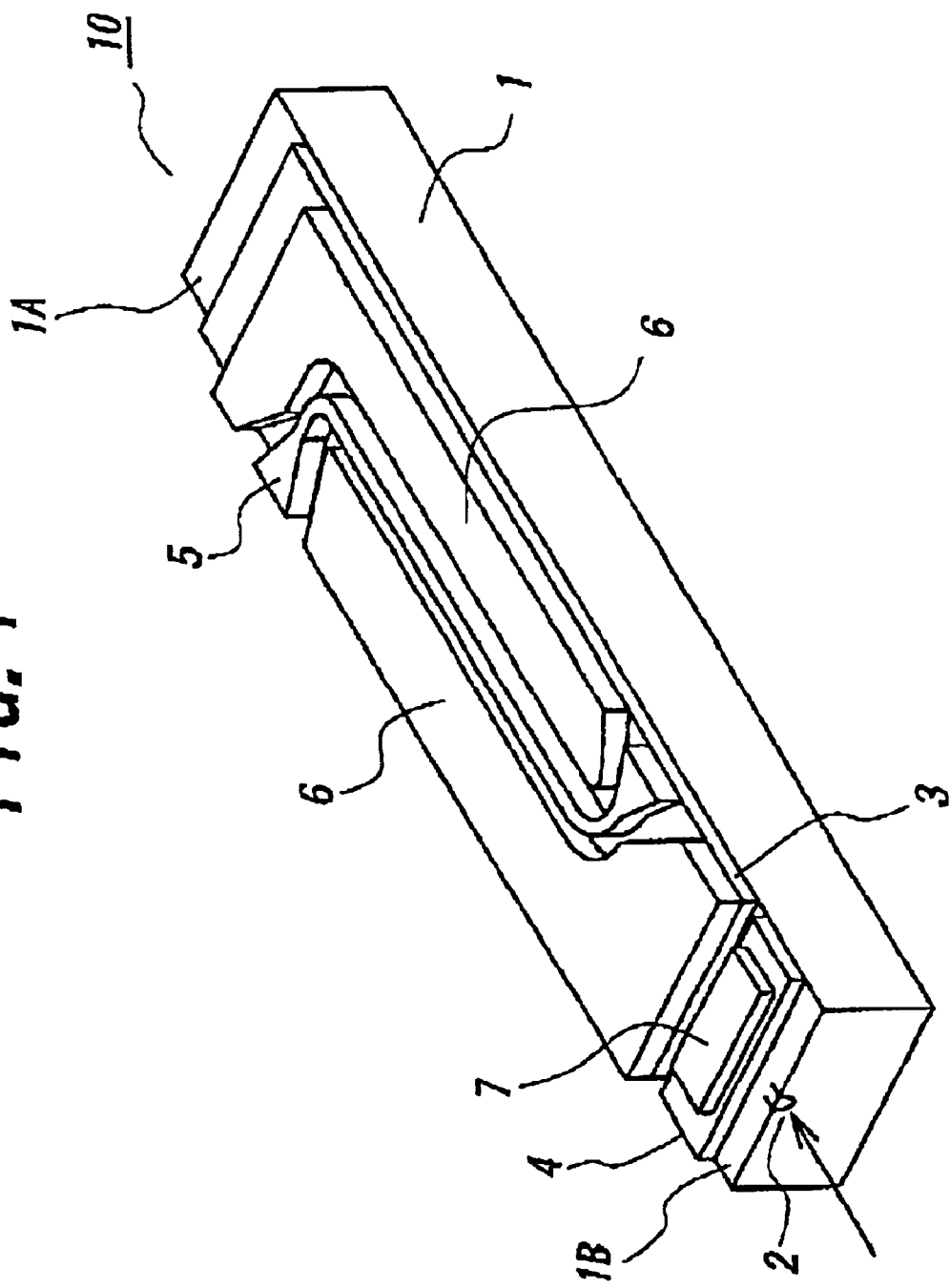
FIG. 1 is a perspective view showing an optical waveguide device according to the present invention.

The invention will be described in detail with reference to the above drawings as follows:

FIG. 1 is a perspective view showing an optical waveguide device according to the present invention. Herein, for the clarity of the features of the present invention, detail parts of the optical waveguide device are not shown in the drawing.

The optical waveguide device 10 depicted in FIG. 1 has a substrate 1 made of a material with an electro-optic effect and a Mach-Zehnder type optical waveguide 2 fabricated on the substrate 1. And, a buffer layer 3 is formed in on main surface 1A of the substrate 1. Moreover, an intermediate layer made of at least one dielectric material selected from the group consisting of $AO_x$, $B_2O_y$, $CO_z$ (A: divalent element, B: trivalent element, C: quadrival element, $0<x<1$, $0<y<3$, $0<z<2$, O: oxygen) is fabricated at the edge portion 1B of the main surface 1A of the substrate 1.

A signal electrode 5 and ground electrode 6, constituting of a modulation electrode for the optical waveguide 2, are provided on the buffer layer 3. Then, a metal-cladding type optical polarizer is fabricated on the corresponding part of the intermediate layer 4 below which the optical waveguide is provided.

In the optical waveguide device 10 depicted in FIG. 1, an incident lightwave introduced in the arrow direction, is polarized by the metal-cladding type optical polarizer 7, and then, the lightwave component parallel to the main surface 1A of the substrate 1 (TE made lightwave) is selected by the metal-cladding type optical polarizer 7. Therefore, only the parallel component is transmitted through the optical waveguide 2, and modulated by a microwave applied from the signal electrode 5 and the ground electrode 6. According to the degree of phase shift in Mach-Zehnder interferometer the parallel component is extinguished or not distinguished and thus, the incident lightwave (parallel component) is switched to the state "on" or "off".

As mentioned above, the metal-cladding type optical polarizer 7 is provided on the intermediate layer 4 made of the above dielectric material in the optical waveguide device 10 depicted in FIG. 1. Therefore, the stress generated between the substrate 1 and the metal-cladding type optical polarizer 7 is damped at the intermediate layer 4, and thus, the mechanical peeling of the metal-cladding type optical polarizer with time can be prevented. Moreover, the excess oxygen is not generated in the intermediate layer 4, and thus, the oxidization and the corrosion of the metal-cladding type optical polarizer 7 with time can be prevented. Accordingly, the stable operation of the optical waveguide device 10 having the metal-cladding type optical polarizer 7 can be maintained for a long time.

It is required that the intermediate layer 4 is made of the above dielectric material. Concretely, MgOx can be exemplified as the AOx. $Al_2Oy$, $Y_2OY$ can be exemplified as the $B_2Oy$. Then, SiOz, ZrOz, HfOz and GeOz can be exemplified as the COz.

Particularly, SiOz can be preferably used because it is not expensive and easy to be formed as a thin film.

The metal-cladding type optical polarizer 7 is consisted of a metallic material, such as Al, Ag, Cr or Pt.

The thickness of the intermediate layer is determined on the refractive index thereof. For example, the thickness of the SiOz intermediate layer is preferably set within 50–100 Å. In this case, the object of the present invention can be realized effectively and efficiently. The thickness of the metal-cladding type optical polarizer 7 is generally set within 1000–3000 Å.

In the optical waveguide device 10 according to the present invention, the signal electrode and the ground electrode may be made of a good conductive metallic material such as Au, Ag or Cu.

The substrate 1 is required to be made of a material having an electro-optic effect, for example, lithium niobate ($LiNbO_3$), lithium tantalate ($LiTaO_3$) and lead lanthanum zirconate titanate (PLZT). Particularly, the $LiNbO_3$ is preferably used because the high quality crystal of it is inexpensively available and it is easy to form the optical waveguide by a Ti thermal diffusion method and so on.

The optical waveguide 2 can be fabricated by a conventional method such as the Ti thermal diffusion method or a proton-exchanging method.

The intermediate layer 4 can be made by a conventional film-forming method such as vacuum deposition method or a sputtering method.

In the case of using the sputtering method, the intermediate layer made of the above-mentioned dielectric material can be deposited when only Ar gas is introduced into a sputtering chamber.

Next, the fabrication method for an optical waveguide device according to the present invention will be described, with reference to FIG. 2.

Figure 2:
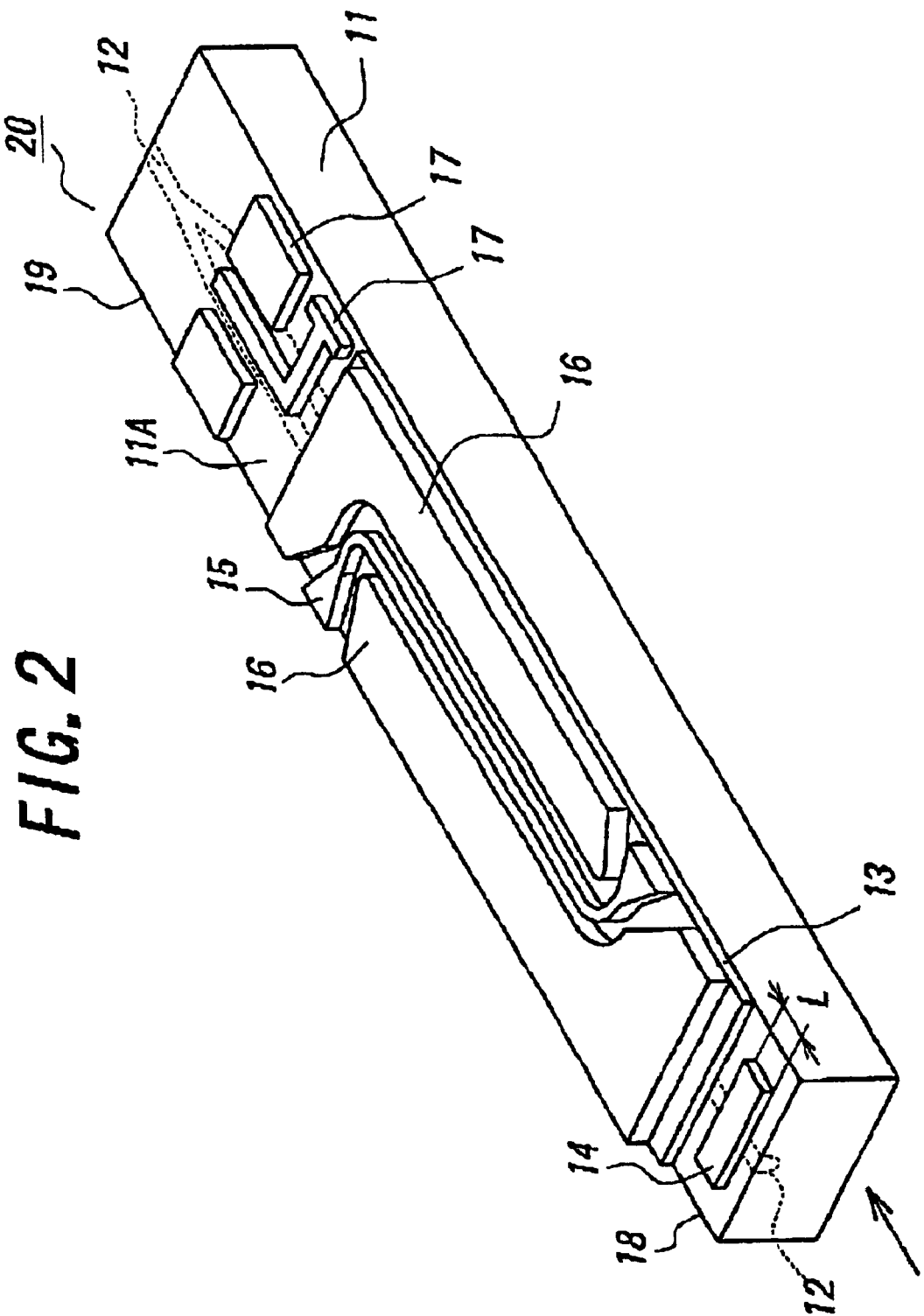
FIG. 2 is a perspective view showing an optical waveguide device according to the fabrication method of the present invention.

An optical waveguide device 20 depicted in FIG. 2 as a preferred embodiment of the present invention has a substrate 11 having an electro-optic effect, an optical waveguide 12 fabricated on the substrate 11, a signal electrode 15 and a ground electrode 16 which constitute a modulation electrode. And, a buffer layer 13 is provided between the substrate 11 and the signal and the ground electrode 15 and 16. Moreover, a mental-cladding type optical polarizer 14 is fabricated on the left edge of the substrate 11 so that it is directly contacted to the main surface 11A of the substrate 11. In addition, DC electrode 17 is fabricated on the light edge of the substrate 11 so that it is directly contacted to the main surface 11A of the substrate 11.

The DC electrode 17 applies a bias voltage to the optical waveguide 12 for controlling the operation point of the optical waveguide device 20.

A lightwave is introduced into the optical waveguide 12 of the optical waveguide device 20 along the depicted arrow direction, and then, the lightwave component parallel to the main surface 11A of the substrate 11 (TE made lightwave) is selected by the metal-cladding type optical polarizer 14. The parallel component is modulated by a microwave applied from the signal electrode 15 and the ground electrode 16, and then, extinguished or not extinguished. Accordingly, the incident lightwave (parallel component) is switched to the state "on" or "off", corresponding to the non-extinction or the extinction of the incident lightwave.

In the present invention, first of all, the optical waveguide 12 is fabricated on the electro-optic substrate 11 by a Ti thermal diffusion method, a proton-exchanging method, an epitaxial growth method and an ion implantation method.

Subsequently, the buffer layer 13 is formed on the substrate 11 by a well known film-forming method such as vacuum deposition method, a sputtering method, an ion-plating method or a CVD method, depending on the kind of the material to form the buffer layer 13.

The thickness of the buffer layer 13 is preferably set within 0.2–2.0 μm, for velocity-matching between a lightwave propagating through the optical waveguide 12 and a microwave as the modulating signal traveling along the signal electrode 15 and the ground electrode 16, and for preventing the absorption loss of the lightwave to the electrodes 15 and 16.

Then, in this invention, the buffer layer 13 is partially removed by non-reactive dry-etching to form a first opening 18.

The non-reactive dry-etching process will be performed as follows:

First of all, a chromium mask is fabricated on the buffer layer 13 by a vacuum deposition method so that the thickness of the chromium mask becomes thicker than that of the buffer layer 13, e.g., 0.3–2.1 μm. Then, a photoresist is spin-coated in a thickness of 0.7–1.0 μm on the chromium mask, and thereafter, is patterned by photolithography. The corresponding part of chromium mask for the first opening 18 to be formed is removed by chemical etching. Then, the residual photoresist is removed by an organic solvent.

Thereafter, the masked substrate is set in a dry-etching apparatus with a high-density plasma resource like ECR, and the buffer layer 13 is dry-etched. In this case, only the corresponding part of the buffer layer 13 without the chromium mask for the first opening 18 to be formed is etched and removed, thereby to form the first opening 18. The residual chromium mask is removed by chemical etching, etc.

In the above non-reactive dry-etching process, any kind of etching gas to generate non-reactive plasma ion species can be employed. Particularly, inert gas can be preferably employed because it has a relatively high etching rate and is chemically stable to be handled easily. Especially, argon gas is preferably employed because it is inexpensively available and the etching rate can be easily controlled.

In the case that a relatively thick buffer layer up to 1.0 $\mu$m or over is formed, it is desired that reactive dry-etching is employed together with the non-reactive dry-etching to form the first opening 18.

That is, first of all, the buffer layer 13 is etched by the reactive dry-etching. Then, just before the main surface 11A of the substrate 11 is exposed, the reactive dry-etching process is changed to the non-reactive dry-etching process.

A high etching rate can be easily realized by the reactive dry-etching process through the chemical reaction. Therefore, the process time to form the first opening 18 for the buffer layer 13 can be shortened. Moreover, since the chromium mask has high etching selectivity against the buffer layer in the reactive dry-etching process, it is not so much etched by the reactive dry-etching even though the thick buffer layer is formed. Therefore, waste of mask forming material can be avoided.

Furthermore, as mentioned above, since the reactive dry-etching process is changed to the non-reactive dry-etching process just before the main surface 11A of the substrate 11 is exposed, excess oxygen is not generated in the superficial part of the substrate 11 even though the buffer layer 13 is over-etched.

In the above reactive dry-etching process, a fluorine-based gas is preferably used. Since much fluorine radicals as one as an etching species of a $SiO_2$, which is commonly employed as the material constituting the buffer layer 13, are generated in the fluorine-based gas, the use of it is extremely effective to achieve high etching rate for the buffer layer 13 to form the first opening 18.

As the fluorine based gas, in addition to the above-mentioned $CF_4$ gas and $CHF_3$ gas, $C_2F$, gas and $C_3F_8$ gas are exemplified.

Subsequently, in the present invention, the metal-cladding type optical polarizer 14 is fabricated on the main surface 11A of the substrate 11 inside the first opening 18.

The metal-cladding type optical polarizer is fabricated as follows: First of all, a photoresist pattern is formed in the first opening 18, and then, a metallic layer is deposited on the photoresist pattern by vacuum deposition method, etc. The cladding length L of the metal-cladding type optical polarizer 14 is generally set within 0.5–5.0 mm.

Subsequently, in the optical waveguide device 20 depicted in FIG. 2 as the preferred embodiment of the present invention, the signal electrode 15 and the ground electrode 16, constituting the modulation electrode, are fabricated on the buffer layer 13 by a deposition method and/or a plating method.

In the optical waveguide device 20, the DC electrode 17 is fabricated on the right edge of the substrate 11. As shown in FIG. 2, it is desired that the DC electrode 17 is fabricated directly on the main surface 11A of the substrate 11 because the velocity matching is not required for the DC electrode 17 and the driving voltage for the DC electrode 17 can be reduced. In this case, the buffer layer 13 is partially etched and removed to form a second opening 19 in the same manner as the first opening 18 for the metal-cladding type optical polarizer 14. Then, the DC electrode 17 is fabricated inside the second opening 19.

For decreasing the number of fabrication process and reducing the fabrication cost for the optical waveguide device, the second opening 19 is preferably formed at the same time when the first opening 18 is formed.

In this invention, the first opening 18 is formed by the above-mentioned non-reactive dry-etching. Therefore, it is expected that the oxygen in the superficial part of the substrate 11 may be reduced, depending on the dry-etching, condition and the degree of over-etching.

Because of carrier generation from the oxygen-reduced superficial part, a large DC drift may be generated at the DC electrode if it is fabricated on the oxygen-reduced substrate.

Therefore, it is desired in fabricating the DC electrode that the substrate is annealed in an oxygen-containing atmosphere after the non reactive dry-etching process.

Concretely, after the first opening 18 and the second opening 19 are formed, the substrate 11 is set in an electric furnace such as a cylindrical furnace and is heated at a temperature within 100–900° C. for 1–20 hours under an oxygen-containing atmosphere.

Herein, the "oxygen-contained atmosphere" means an atmosphere containing oxygen in a predetermined proportion such as a synthetic air or an atmospheric air in addition to a pure oxygen gas.

The annealing process in the oxygen-containing atmosphere is preferably carried out after the fabrication process of the first and the second openings 18 and 19 and before the fabrication process of the metal-cladding type optical polarizer 14 for preventing the oxidization of the metallic layer of it.

As mentioned above, in the case that a thick buffer layer is formed the second opening 19 is also made by the reactive dry-etching in addition to the non-reactive dry-etching.

In FIG. 2, only the DC electrode 17 is fabricated in the second opening 19. However, if the DC electrode is not fabricated, the concave portion having a buffer layer remnant may be formed instead of the second opening 19, and the modulation electrode consisting of the signal electrode 15 and the ground electrode 16 may be fabricated on the buffer layer remnant inside the concave portion. In this configuration, the driving voltage of optical waveguide device can be lowered.

Moreover, it is desired that only the signal electrode is fabricated on the buffer layer remnant inside the concave portion. In this case, the driving voltage for the optical waveguide device can be reduced effectively, and the velocity machining between lightwave propagating through the optical waveguide and microwave traveling along the modulation electrode can be improved. Then, the absorption of the lightwave to the modulation electrode can be prevented.

On the other hand, the DC electrode is preferably fabricated directly on the main surface 11A of the substrate 11 through the second opening 19 because of the reduction of the bias voltage.

The above-mentioned concave portion may be formed in addition to the second opening 19. In this case, the DC electrode 17 is fabricated in the second opening 19, and the modulation electrode is fabricated on the buffer layer remnant inside the concave portion. Therefore, the above-mentioned effects for the DC electrode and the modulation electrode can be realized.

The concave portion may be formed as a third opening so that the main surface of the substrate is exposed.

For decreasing the number of fabrication process and reducing the fabrication cost of the optical waveguide device, the third opening is formed at the same time when the first and the second openings 18 and 19 are formed. The third opening is formed by the above-mentioned non-reactive dry-etching as well as the first and the second openings 18 and 19. Also, the reactive dry-etching may be employed together.

It is also desired that the substrate is annealed under an oxygen-containing atmosphere after the third opening is formed, as mentioned above. The same annealing condition for the first and the second openings 18 and 19 may be employed to the third one.

At the time when the first and the second openings 18 and 19 are formed, the buffer layer exposed between the signal electrode 15 and the ground electrode 16 can be partially removed by the dry-etching. In this configuration, the field leakage of a modulation signal from the signal electrode 15 through the buffer layer can be reduced. Therefore, the modulation signal can be concentrated to the optical waveguide, and thus, the modulation efficiency of the optical waveguide device can be improved.

The fabrication method of the present invention can be favorably applied to a substrate made of a lithium-containing ferroelectric material. If the conventional fabrication method employing reactive dry-etching process by fluorine-based gas is applied to such a substrate, the fluorine radicals are selectively reacted with the lithium in the substrate to form fluorides, and the lithium is extricated from the substrate. Therefore, excess oxygen exist in the superficial part of the substrate.

On the contrary, according to the present invention, such fluorides are not generated, and thus, excess oxygen is not generated in the superficial part of the substrate. As a result, since the metal-cladding type optical polarizer is fabricated on the oxygen-reduced substrate, it is hard to corrode, which is quite different from the case in which the metal-cladding type optical polarizer is fabricated on the substrate provided by the conventional fabrication method being oxygen-excessive state.

As the lithium-containing ferroelectric material, lithium niobate ($LiNbO_3$) and lithium tantalate ($LiTaO_3$) may be exemplified. Particularly, the $LiNbO_3$ is preferably used because the high quality crystal of it is inexpensively available and it is easy to form the optical waveguide by a Ti thermal diffusion method and so on.

EXAMPLES

This invention will be concretely described on the examples, with reference to the drawings.

Example 1

In this example, such an optical waveguide device 10 as shown in FIG. 1 was fabricated.

The substrate 1 was made of an X-cut lithium niobate single crystal. Then, the optical waveguide 2 was formed on the substrate 1 by a Ti thermal diffusion method. Subsequently, the buffer layer 3 was fabricated from $SiO_2$ in a thickness of 1.0 μm on the main surface 1A of the substrate 1 by a sputtering method.

A photoresist was spin-coated on the entire surface of the substrate, and patterned by photolithography so that a part of the buffer layer 3 corresponding to the straight part of the optical waveguide is partially exposed. The substrate was set in a dry-etching apparatus with an ECR plasma resource, and the buffer layer is partially etched through the photoresist mask. The exposed part of the buffer layer from the photoresist mask was removed and the main surface of the substrate 1 was partially exposed to form an opening, Thereafter, the residual photoresist was removed by an organic solvent.

Subsequently, a photoresist was spin-coated and patterned so as to expose the corresponding part of the opening for the metal-cladding type optical polarizer 7 to be fabricated. Then, the intermediate layer 4 consisting of a 100 Å-thick $SiO_z$ ($0<z<2$) and an Al film having a thickness of 1000 Å were subsequently deposited on the exposed substrate by a sputtering method. The residual $SiO_z$ layer and the Al layer on the photoresist were removed by applying lift-off technique, to complete the metal-cladding type optical polarizer having an intermediate layer.

Herein, the intermediate layer 4 was sputtered from a $SiO_2$ target under argon gas atmosphere and the gas pressure and the input power for the target was set to be 0.5 Pa and 10 W/cm$^2$, respectively.

After the formation of an underlay consisting of Ti and Au layers fabricated on the buffer layer 3 by vacuum deposition, a thick Au layer was plated to form modulation electrodes. By means of chemical etching for the underlay exposed between the electrodes, the signal electrode 5 and the ground electrode 6 having a thickness of 20 μm were isolated each other and the optical waveguide device 10 was completed.

The 20 pieces of the optical waveguide device 10 were fabricated and a heat-cycle of −90° C. to 70° C. was given 100 times to them. After the heat-cycle test, the metal-cladding type optical polarizer was not peeled in all optical waveguide device. The deterioration of TE/TM extinction ratio was ranged within 0.5–1.0 dB.

Comparative Example 1

Except that the intermediate layer 4 was not fabricated, an optical waveguide device was fabricated in the same manner as in Example 1. The 20 pieces of the optical waveguide device were fabricated, and tested in the same heat-cycle condition as in Example 1. As a result, peeling of the metal-cladding type optical polarizer was observed in four pieces from tested the optical waveguide devices. Moreover, the TE/TM extinction ratio were deteriorated within 2.0–10.0 dB As is apparent from Example 1 and Comparative Example 1, according to the present invention, mechanical peeling of the polarizer is prevented by providing the intermediate layer made of $SiO_z$ ($0<z<2$) between the substrate and the metal-cladding type optical polarizer.

Moreover, it was turned out that the metal-cladding type optical polarizer was not oxidized and/or corroded since the deterioration of TE/TM extinction ratio is efficiently suppressed in the heat-cycle test. Therefore, the obtained optical waveguide device can be operated stably for a long time.

Example 2

In this example, such an optical waveguide device 20 as shown in FIG. 2 was fabricated, according to the fabrication method of the present invention. Herein, the second opening 19 and the DC electrode 17 were not formed.

The substrate 11 was made of an X-cut lithium niobate single crystal. Then, the optical waveguide 12 was formed on the substrate 11 by a Ti thermal diffusion method. Subsequently, the buffer layer 13 was fabricated from $SiO_2$ in a thickness of 0.5 μm on the main surface 11A of the substrate 11 by a vacuum deposition method. For the improvement of the mechanical strength of the buffer layer 13 and the compensation of oxygen for the oxygen vacancy in the buffer layer 13, the substrate 11 having the buffer layer 13 was annealed at 600° C. for five hours in an oxygen-containing atmosphere.

Then, by employing a dry-etching apparatus with an ECR plasma resource and argon gas as an etching gas, the first opening 18 was formed in the same manner as above-mentioned process.

Then, the metal-cladding type optical polarizer 14 consisting of an Al layer having a thickness of 1000 Å and its cladding length of 5 mm was fabricated in the first opening 18 in the same manner as above-mentioned process.

Then, an underlayer consisting of a Ti layer and a Au layer were fabricated on the buffer layer 13 by vacuum deposition, and a thick Au layer was plated to form modulation electrodes. The Ti/Au underlayer was chemically etched and the signal electrode 15 and the ground electrode 16 having a thickness of 20 μm were isolated each other and the optical waveguide device 20 was completed.

Optical fibers were connected to the optical waveguide device 20, and the TE/TM extinction ratio was measured. As a result, it was turned out that the optical waveguide device 20 exhibited a high TE/TM extinction ratio of about 21 dB.

Example 3

In this example, such an optical waveguide device 20 as shown in FIG. 2 was fabricated, according to the fabrication method of the present invention. Herein, the thickness of the buffer layer 13 was set to be 1.0 μm, different from Example 2.

Then, a dry-etching apparatus with an ECR plasma resource was employed, and the first opening 18 and the second opening 19 were formed in the same manner as the above-mentioned process. In this case, firstly, the buffer layer 13 was removed in its thickness direction by about 0.9 μm through the reactive dry-etching, and the residual part having about 0.1 μm-thick was removed through the non-reactive dry-etching using the argon gas.

The substrate 11 was annealed at 600° C. for five hours in an oxygen atmosphere, and then, the metal-cladding type optical polarizer 14 was fabricated.

Subsequently, the signal electrode 15 and the ground electrode 16 were fabricated in the same manner as in Example 2, and at the same time, the DC electrode 17 was fabricated by designated mask.

Optical fibers were connected to the obtained optical waveguide device 20, and the TE/TM extinction ratio was measured. As a result, it was turned out that the optical waveguide device exhibited a high TE/TM extinction ratio of about 20 dB.

Figure 3:
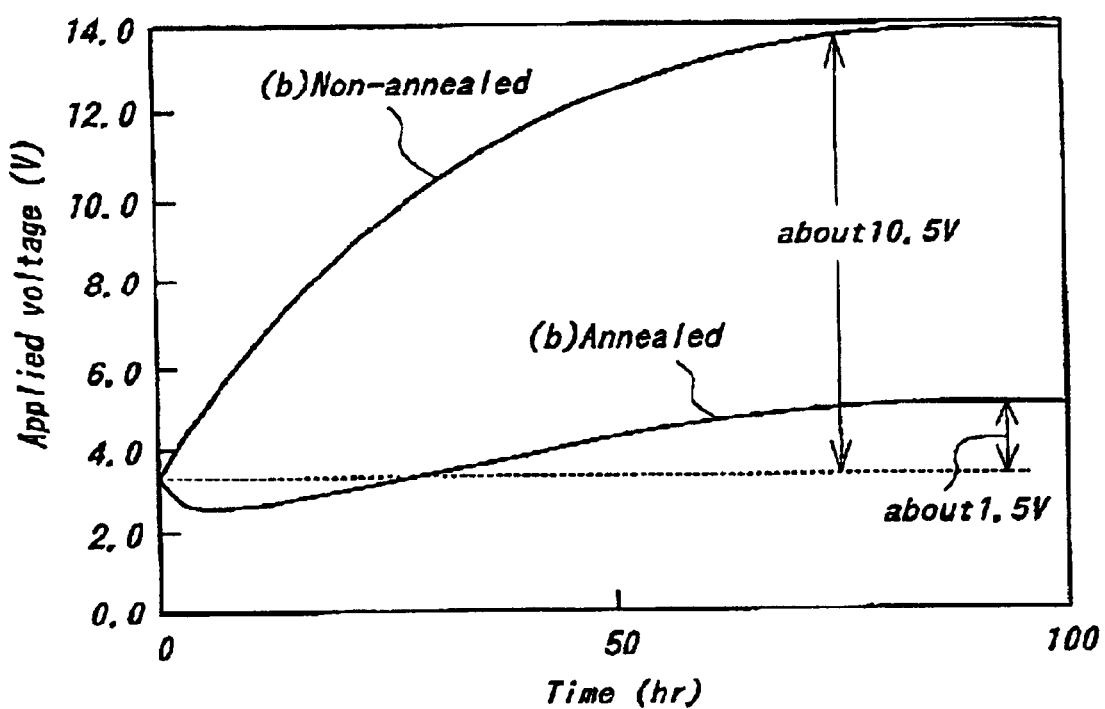
FIG. 3 shows DC drift curves of optical waveguide devices according to the present invention and the referential example.

Moreover, the DC drift of the optical waveguide device 20 was measured, and the DC drift curve (a) as shown in FIG. 3 was obtained. The magnitude of the DC drift was estimated as about 1.5V from FIG. 3.

Comparative Example 2

Except that the first opening 18 was formed by the reactive dry-etching using $CF_4$ gas, an optical waveguide device was fabricated in the same manner as in Example 2. The obtained optical waveguide device exhibited a low TE/TM extinction ratio of about 2 db.

Referential Example

Except that the substrate 11 was not annealed in the oxygen-containing atmosphere after formation of the first and the second openings 18 and 19, an optical waveguide device was fabricated in the same manner as in Example 3.

The TE/TM extinction ratio of the obtained optical waveguide device was about 18 dB when it was measured in the same manner as in Example 2.

The DC drift of the optical waveguide device was measured and the DC drift curve (b) was obtained as shown in FIG. 3. Then, the magnitude of the DC drift was about 10.5V.

As is apparent from Examples 2, 3 and Comparative Example 2, by forming the first opening through the non-reactive dry-etching and fabricating the metal-cladding type optical polarizer in the first opening, the optical waveguide device obtained from the present invention can exhibit a high extinction ratio.

As is apparent from Example 3 and Referential Example, by substrate annealing in the oxygen-containing atmosphere before formation of the DC electrode, the DC drift of the optical waveguide device obtained from the present invention can be reduced.

Although the present invention was described in detail with reference to the above examples, this invention is not limited to the above disclosure and every kind of variation and modification may be made without departing from the scope of the present invention.

INDUSTRIAL APPLICABILITY

In an optical waveguide device according to the present invention, an intermediate layer made of an oxygen-starred dielectric oxide is provided between a substrate and a metal-cladding type optical polarizer. Therefore, the mechanical peeling, the oxidization and/or corrosion with time of the metal-cladding type optical polarizer can be prevented. As a result, the obtained optical waveguide device can be operated stably for a long time, In a fabrication method according to the present invention, if an opening is formed through the dry-etching for the buffer layer which is provided on a substrate, excess oxygen is not generated in the superficial part of the substrate. Therefore, even though the metal-cladding type optical polarizer is fabricated on the substrate, it is never corroded. As a result, the obtained optical waveguide device can exhibit a high extinction ratio.

What is claimed is:

1. A method for fabricating an optical waveguide device including an optical waveguide, a buffer layer, a metal-cladding type optical polarizer and a modulation electrode on a substrate with an electro-optic effect, comprising:

a first step to form the optical waveguide on the substrate, a second step to fabricate the buffer layer on the substrate, a third step, by means of partial removal of the buffer layer employing non-reactive dry-etching, to form a first opening so that the corresponding part of the main surface of the substrate on which the optical waveguide is formed, is partially or entirely exposed, and a fourth step to fabricate the metal-cladding type optical polarizer on the substrate inside the first opening.

2. A fabrication method as defined in claim 1, wherein the non-reactive dry-etching is carried out using inert gas.

3. A fabrication method as defined in claim 2, wherein the inert gas is argon gas.

4. A fabrication method as defined in claim 4, wherein the third step includes a fifth step of partial removal of the buffer layer in its thickness direction employing reactive dry-etching.

5. A fabrication method as defined in claim 4, wherein the reactive dry-etching is carried out using a fluorine-based gas.

6. A fabrication method as defined in any one of claim 1, wherein the substrate is made of lithium niobate.

* * * * *